Patented Sept. 30, 1941

2,257,137

UNITED STATES PATENT OFFICE 2,257,137

METHOD OF PRODUCING HYDROGENATION PRODUCTS OF COMPOUNDS OF THE CYCLOPENTANO-10,13-DIMETHYL POLYHYDROPHENANTHRENE SERIES

Lothar Strassberger, Berlin-Wilmersdorf, and Ludwig Kraft, Berlin - Charlottenburg, Germany, assignors to Schering Corporation, Bloomfield, N. J., a corporation of New Jersey No Drawing. Application March 4, 1936, Serial No. 67,094. In Germany March 7, 1935

16 Claims. (Cl. 260—397.4)

This invention relates to hydrogenation compounds of the cyclopentano polyhydro phenanthrene series and more particularly to saturated and unsaturated hydroxy compounds of the cyclopentano polyhydro phenanthrene series and to a method for producing the same.

One object of the present invention is the transformation of saturated and unsaturated diketones of the cyclopentano polyhydro phenanthrene series, the so-called androstandione and androstendione or their isomers, of the general formula $C_{19}H_mO_2$ wherein $m$ equals 28 or 26, into the corresponding saturated hydroxy ketones, the so-called androstanolones, of the general formula $C_{19}H_{30}O_2$. This transformation is effected by subjecting the starting material to the action of hydrogenating agents under conditions whereby only one keto group of the diketones is reduced to the secondary alcohol group while the carbon to carbon double bond when present in the molecule of the starting material is saturated.

Suitable hydrogenating agents and conditions are, for instance, catalytically activated hydrogen in the presence of relatively weakly active catalysts and/or relatively low temperatures. It is advisable in order to produce androstanolones also to proportion the amount of hydrogen used in reduction in such a manner that for the reduction of the androstandione essentially only 1 mol of hydrogen and for the reduction of the androstendione only 2 mol of hydrogen are brought into reaction.

In the hydrogenation of the saturated and unsaturated diketones to the saturated hydroxy ketones consideration must be paid to the fact that there is a possibility given for the formation of various isomeric modifications and that the ratio, in which the different isomeric forms are obtained, is itself dependent upon the methods of reduction and the hydrogen ion concentration of the reduction solution. In accordance with the rule of Auwers and Skita mainly the trans-modifications are formed by hydrogenation in neutral and alkaline medium whilst on the other hand, in acid solution, the cis-modifications are obtained.

The starting material, i. e., the saturated and unsaturated diketones androstandione and androstendione or their isomers, used for carrying out this hydrogenation process may be obtained in any desired manner, for instance, by oxidation of saturated or unsaturated hydroxy ketones of the general formula $C_{19}H_nO_2$ wherein $n$ equals 30 or 28. Said oxidation can be carried out in the usual manner, e. g., with chromic acid at an ordinary temperature, whereby the carbon to carbon double bond when present in the molecule of the starting material may intermediately be protected from oxidation by the addition of halogen or hydrogen halide, but other oxidation agents known to those skilled in the art may also be used, for instance, copper-oxide or other similar substances.

The progress made by hydrogenating said saturated and unsaturated androstandiones to the corresponding saturated androstanolones consists in the fact that hydroxyketones can be obtained that possess valuable physiological properties similar or equal to those of the male sex hormones. Thus, for instance, by oxidizing the saturated and unsaturated hydroxy ketones of the trans-modification, e. g., the so-called transandrosterone and the dehydro-androsterone, to the corresponding diketones androstandione and androstendione and hydrogenating said diketones in an acid medium to the saturated hydroxy ketone of the cis-modification, the so-called epiandrostanolone or androsterone, synthetically readily available compounds of the cyclopentano polyhydro phenanthrene series having only a very low physiological activity of 1.4 mg. or 0.6 mg. respectively for the capon unit, are transformed into the natural male sex hormone androsterone of high physiological activity, namely 0.2 mg. for the capon unit. This product hitherto could be obtained only with difficulty by extracting the urine of male individuals.

The process described above may be illustrated, for instance, by the following formulas:

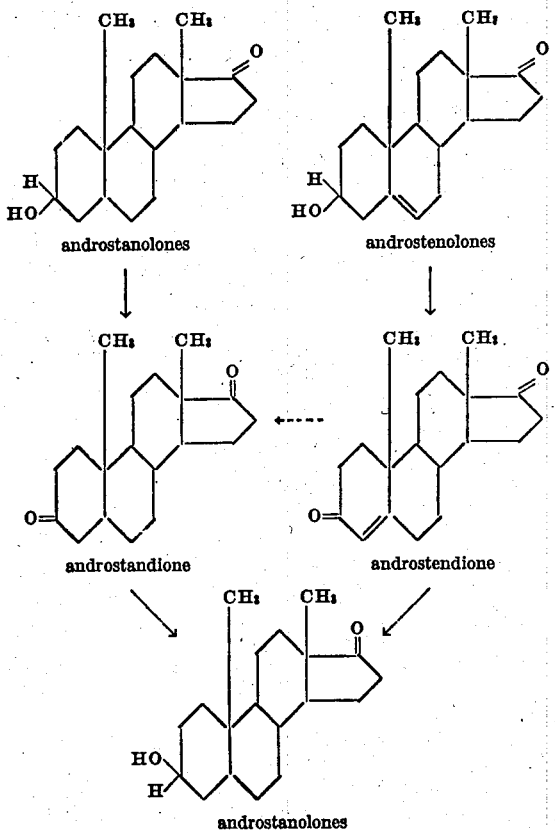

The following examples serve to illustrate the above mentioned process without, however, limiting the same to them.

*Example 1*

4 grams of trans-androsterone, obtained according to Ruzicka (Helv. chim. act., vol 17, pages 1389 and 1395, 1934) are dissolved in 400 ccs. of glacial acetic acid, treated with the quantity of chromic acid corresponding to 1.5 atoms of oxygen, and allowed to stand for 1 day at room temperature. Thereupon the solution is evaporated until crystallisation commences, and the diketone androstandione is precipitated from the residue with water. Purification by crystallisation from alcohol; M. P. 129° C.

0.5 gram of platinum black are previously reduced with hydrogen in 25 ccs. of glacial acetic acid at 50–60° C. and mixed with a solution of 1.5 grams of androstandione in 50 ccs. of glacial acetic acid whereinto have been added 1.2 ccs. of 48% aqueous hydrobromic acid. The reduction is allowed to take place in a hydrogen atmosphere at 70–75° C. and after the taking up of 1 mol of hydrogen it comes to an end. The whole is poured into water, the separated product taken up in ether, the ether washed with dilute alkali and after drying the solvent removed by evaporation. The substance is purified from the trans-androsterone simultaneously produced in small quantity, by precipitation of this substance with a saponin such as digitonin. Recrystallised from dilute alcohol, the end product melts at 178° C. The unit in the capon comb test evaluated according to the method of Schoeller and Gehrke, Wiener Archiv f. innere Medizin, 21, 328, 1931, amounts to 150–200γ.

Instead of carrying out the hydrogenation in glacial acetic acid as a solvent at a temperature of 70–75° C. the androstandione may be hydrogenated in alcoholic solution at a temperature of 50–60° C.

*Example 2*

To a solution of 2.9 grams of dehydro-androsterone in 100 ccs. of glacial acetic acid there are added consecutively with stirring and cooling a solution of 1.6 grams of bromine in 30 ccs. of glacial acetic acid and a solution of 0.732 gram of chromic acid anhydride in 40 ccs. of glacial acetic acid. After standing over night, 20 grams of zinc are added and the whole stirred for 10 minutes at 100° C., allowed to cool rapidly and poured into water. The separated product is taken up in ether and washed with dilute caustic soda lye. On evaporation of the ether there remains the androstendione, which is recrystallised from dilute alcohol, M. P. 163° C.

A solution of 1.5 grams of androstendione in 50 ccs. of glacial acetic acid after the addition of 0.5 gram of platinum black is treated at room temperature with hydrogen, whereby after the addition of 1 mol of hydrogen with saturation of the double bond the reaction ceases.

There are now added to the reaction mixture 25 ccs. of glacial acetic acid with 1 cc. of concentrated sulphuric acid and further hydrogenation takes place at 70–75° C. After the taking up of a further mol of hydrogen working up is effected as in Example 1 and the same end product is obtained.

*Example 3*

0.5 gram of platinum oxide are previously reduced in 25 ccs. of ethyl alcohol. To this mixture a mixture of 60 ccs. of ethyl alcohol is added that contains 0.7 gram of sodium and 2.88 grams of androstandione prepared, for instance, from androsterone according to Butenandt, Zeitschrift für physiologische Chemie 229, page 189 (1934). The combined solutions are shaken with hydrogen at room temperature until one mol of hydrogen has been taken up. Then the catalyst is filtered off and the filtrate is poured into water, the precipitate taken up with ether, the ethereal solution is dried and the ether evaporated off. The residue is recrystallised from 90% alcohol. Thus, 2.5 grams of trans-androsterone of the melting point of 171–172° C. are obtained.

Another object of the present invention is the transformation of unsaturated diketones of the cyclopentano polyhydro phenanthrene series, the so-called androstendione or its isomers, having the general formula $C_{19}H_{26}O_2$, into unsaturated dialcohols, the so-called Δ4,5-androstendiols or their isomers, having the general formula $$C_{19}H_{30}O_2$$

This transformation is effected by subjecting the starting material to the action of hydrogenating agents and to hydrogenation conditions that will cause hydrogenation of the two keto groups only, but leaving unattacked the carbon to carbon double bond present in the molecule of said starting material.

Suitable hydrogenating agents are, for instance, metal alcoholates such as aluminum alcoholates and so on.

The progress achieved by the hydrogenation process according to this embodiment of the invention consists in the feature that valuable unsaturated dialcohols are obtained which, for instance, can serve as intermediate products for the production of physiologically active substances having properties similar or equal to the male sex hormones.

The process of hydrogenating androstendiones to the corresponding androstendiols may be illustrated by the following formulas:

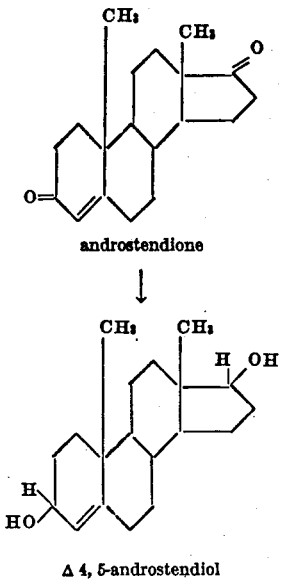

androstendione

↓

Δ 4, 5-androstendiol

The following example serves to illustrate the process above described without, however, limiting the same to it:

*Example 4*

A solution of 3.4 grams of androstendione and 4.7 grams of aluminum isopropylate in 100 ccs. of absolute isopropyl alcohol is heated to boiling whereby in the course of seven hours 70 ccs. of a mixture of isopropyl alcohol and acetone are distilled off by means of a fractionating column. After cooling the reaction solution 70 ccs. of absolute isopropyl alcohol are added and further 30 ccs. of the solvent are distilled off. The amount of acetone formed is determined by reaction with hydroxyl-amine hydrochloride and titrating the hydrochloric acid set free thereby. More than 90% of the theoretical amount of acetone are found.

After cooling the reaction mixture it is poured into ice-cold dilute hydrochloric acid and after standing for two hours is extracted with ether. On evaporating the ether a mixture of unsaturated dialcohols of the melting point of 150–155° C. is obtained in about quantitative yield; therefrom two isomeric unsaturated dialcohols can be separated by means of digitonine.

A still further object of the present invention is the transformation of saturated and unsaturated diketones of the cyclopentano polyhydro phenanthrene series, the so-called androstandiones and androstendiones or their isomers, having the general formula $C_{19}H_mO_2$ wherein $m$ equals 28 or 26, to the corresponding saturated dialcohols, the so-called androstandiols or their isomers, having the general formula $C_{19}H_{32}O_2$. This transformation is effected by subjecting the starting material to the action of hydrogenating agents and hydrogenation conditions that will cause hydrogenation of the two keto groups as well as of the carbon to carbon double bond when present in the molecule of the starting material.

Suitable hydrogenating agents and conditions are, for instance, catalytically activated hydrogen in the presence of relatively strongly active catalysts and/or relatively higher temperatures of hydrogenation; the use of hydrogen in statu nascendi under suitable conditions has also proved to be of value.

In the hydrogenation of the saturated and unsaturated diketones to the saturated dialcohols consideration must be paid to the fact that there is a possibility given for the formation of various isomeric modifications and that the ratio, in which the different isomeric forms are obtained, is itself dependent upon the methods of reduction and the hydrogen ion concentration of the reduction solution. In accordance with the rule of Auwers and Skita mainly the trans-modifications are formed by hydrogenation in neutral and alkaline medium whilst on the other hand, in acid solution, the cis-modifications are obtained.

The progress achieved by this hydrogenation process consists in the feature that valuable saturated dialcohols are obtained that can be worked up to substances of high physiological activity similar to that the of the male sex hormones or that show themselves a remarkably high physiological activity, as, for instance, the cis-androstandiol, the activity of which is three to four times as high as that of the male sex hormone androsterone.

Said process of hydrogenating the saturated or unsaturated diketones to the corresponding saturated dialcohols according to the present invention may be illustrated by the following formulas:

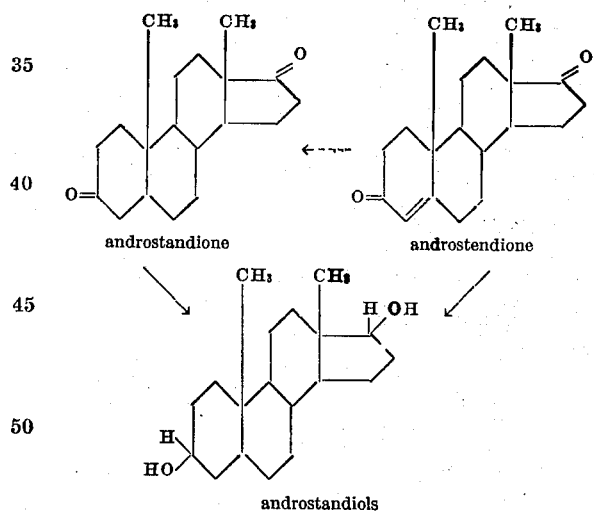

androstandione        androstendione androstandiols

The following examples serve to illustrate the above mentioned process without, however, limiting the same to them.

*Example 5*

1 gram of androstandione is dissolved in 200 ccs. of alcohol. To this solution are added in portions 2 grams of metallic sodium; after the solution of the sodium the alcoholic solution is poured into water and extracted with ether. After the evaporation of the ether a residue is obtained which can be freed from unreacted or not completely reacted starting material by means of semicarbazide solution or the like. On purification of the residue with alcohol a crystallisate of the melting point 160–162° C. is obtained, representing a trans-androstandiol.

*Example 6*

1 gram of androstandione is hydrogenated in a mixture of 40 ccs. of alcohol and 1.3 grams of concentrated sulphuric acid in the presence of 0.5 gram of platinum oxide until no more hydrogen is taken up. The catalyst is filtered off, the filtrate diluted with water and the precipitate taken up with ether. The ethereal solution is washed with sodium hydroxide solution and evaporated to dryness. On recrystallising the residue from dilute alcohol, a saturated dialcohol of the melting point of 219° C. is obtained, representing a cis-androstandiol.

*Example 7*

1 gram of androstendione is heated with 40 grams of dekahydronaphthalene and 0.5 gram of a nickel catalyst on silicagel in a hydrogen atmosphere and at elevated pressure to 200° C. After filtering off the catalyst and distilling off the dekahydronaphthalene a residue remains which consists of a mixture of androstandiols. On crystallising from dilute alcohol colorless needles are obtained which melt unsharply at about 160° C.

Of course, various modifications and changes in the reaction conditions etc. may be made by those skilled in the art in accordance with the principles set forth herein and in the claims annexed hereto.

What we claim is:

1. Process for the production of hydrogenation compounds of the cyclopentano polyhydro phenanthrene series comprising subjecting 3,17-diketones of the cyclopentano polyhydro phenanthrene series having the general formula $C_{19}H_mO_2$ wherein $m$ equals 28 or 26, to the actions of hydrogenating agents, and stopping the hydrogenation when a product of the general formula $C_{19}H_{30}O_2$ is obtained.

2. Process according to claim 1 comprising transforming the diketones into saturated hydroxy ketones of the cyclopentano polyhydro phenanthrene series having the general formula $C_{19}H_{30}O_2$.

3. Process according to claim 1 comprising using as starting material a saturated diketone of the cyclopentano polyhydro phenanthrene series having the general formula $C_{19}H_{28}O_2$.

4. Process according to claim 1 comprising using as starting material an unsaturated diketone of the cyclopentano polyhydro phenanthrene series having the general formula $C_{19}H_{26}O_2$.

5. Process according to claim 1 comprising using as hydrogenating agent hydrogen in the presence of a relatively weakly active catalyst capable of effecting reduction of a keto group to an alcohol group.

6. Process according to claim 1 comprising effecting the hydrogenation at temperatures below about 75° C.

7. Process according to claim 1 comprising using as starting material a saturated diketone of the cyclopentano polyhydro phenanthrene series having the general formula $C_{19}H_{28}O_2$ and bringing into reaction only about one mol of hydrogen for the hydrogenation of one mol of the saturated diketone.

8. Process according to claim 1 comprising using as starting material an unsaturated diketone of the cyclopentano polyhydro phenanthrene series having the general formula $C_{19}H_{26}O_2$ and bringing into reaction only about two mols of hydrogen for the hydrogenation of one mol of the unsaturated diketone.

9. Process according to claim 1 comprising transforming the diketones into saturated hydroxy ketones of the cyclopentano polyhydro phenanthrene series having the general formula $C_{19}H_{30}O_2$ and effecting the selective formation of preponderating amounts of various isomeric modifications of the hydrogenation products by adjusting the hydrogen ion concentration of the hydrogenation solution.

10. Process according to claim 1 comprising transforming the diketones into saturated hydroxy ketones of the cyclopentano polyhydro phenanthrene series having the general formula $C_{19}H_{30}O_2$ and effecting the selective formation of the cis-modifications of the hydrogenation products by carrying out the hydrogenation in an acid medium.

11. The process which comprises oxidizing the saturated hydroxy ketone trans-androsterone of the general formula $C_{19}H_{30}O_2$ to the saturated diketone androstandione of the general formula $C_{19}H_{28}O_2$ and subjecting said diketone in an acid medium to the action of about one mol of hydrogen in the presence of hydrogenation catalysts capable of effecting reduction of a keto group to an alcohol group.

12. The process which comprises oxidizing the unsaturated hydroxy ketone dehydro-androsterone of the general formula $C_{19}H_{28}O_2$ to the unsaturated diketone of the general formula $C_{19}H_{26}O_2$ and subjecting said diketone in an acid medium to the action of about two mols of hydrogen in the presence of hydrogenation catalysts capable of effecting reduction of a keto group to an alcohol group.

13. The process which comprises transforming an unsaturated 3,17-diketone of the cyclopentano polyhydro phenanthrene series having the general formula $C_{19}H_{26}O_2$ into unsaturated dialcohols having the general formula $C_{19}H_{30}O_2$, by reacting said diketone with a hydrogenating agent.

14. Process according to claim 13 comprising using as hydrogenating agent a metal alcoholate.

15. Process according to claim 13 comprising using as hydrogenating agent an aluminum alcoholate.

16. The process which comprises oxidizing the unsaturated hydroxy ketone dehydroandrosterone of the general formula $C_{19}H_{28}O_2$ to the unsaturated diketone of the general formula $C_{19}H_{26}O_2$ and subjecting said diketone to the action of hydrogenating agents, and stopping the hydrogenation when a product of the general formula $C_{19}H_{30}O_2$ has been obtained.

LOTHAR STRASSBERGER.
LUDWIG KRAFT.